(12) United States Patent
Leroux et al.

(10) Patent No.: US 11,175,788 B2
(45) Date of Patent: Nov. 16, 2021

(54) SAFELY CAPTURING SUBSEQUENT KEYSTROKE INPUTS INTENDED FOR A FIRST WINDOW WHEN A SECOND WINDOW CHANGES SYSTEM FOCUS FROM THE FIRST WINDOW TO THE SECOND WINDOW

(71) Applicant: International Business Machines Corporation, Armonk, NY (US)

(72) Inventors: Daniel D. J. Leroux, Kanata (CA); Adam M. Mooz, Kanata (CA); Adam R. R. Neal, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/508,403

(22) Filed: Jul. 11, 2019

(65) Prior Publication Data

US 2019/0332228 A1    Oct. 31, 2019

Related U.S. Application Data

(63) Continuation of application No. 15/714,929, filed on Sep. 25, 2017, now abandoned.

(51) Int. Cl.
*G06F 3/00* (2006.01)
*G06F 3/0481* (2013.01)
*G06F 9/451* (2018.01)
*G06F 3/02* (2006.01)

(52) U.S. Cl.
CPC ............ *G06F 3/0481* (2013.01); *G06F 9/451* (2018.02); *G06F 3/0227* (2013.01); *G06F 2203/04803* (2013.01)

(58) Field of Classification Search
CPC .................. G06F 3/0481; G06F 9/451; G06F 2203/04803; G06F 3/0227; H04L 67/38; H03M 11/00
USPC .......................................................... 715/802
See application file for complete search history.

(56) References Cited

U.S. PATENT DOCUMENTS

| | | | |
|---|---|---|---|
| 7,055,104 B1 * | 5/2006 | Billmaier | G06F 3/0481 348/E5.104 |
| 8,924,875 B2 | 12/2014 | Dolph et al. | |
| 2003/0210270 A1 * | 11/2003 | Clow | G06F 3/04886 715/767 |

(Continued)

OTHER PUBLICATIONS

IBM, "List of IBM Patents or Patent Applications Treated As Related," for U.S. Appl. No. 16/508,403, filed Jul. 11, 2019.

*Primary Examiner* — David Faber
(74) *Attorney, Agent, or Firm* — Patterson + Sheridan, LLP

(57) ABSTRACT

Methods to perform an operation comprising receiving a first subset of keystroke inputs, of a plurality of keystroke inputs, in a first text input area in a first window, determining that a second window has changed a system focus from the first window to the second window in the absence of an explicit user request to change the system focus, wherein the second window does not include a text input area, wherein a second subset of keystroke inputs of the plurality of keystroke inputs are not received by the first text input area subsequent to changing the system focus, configuring the second window to include a safe-capture area, and capturing the second subset of keystroke inputs in the safe-capture input area while the system focus remains on the second window.

7 Claims, 8 Drawing Sheets

(56) References Cited

U.S. PATENT DOCUMENTS

| | | |
|---|---|---|
| 2006/0224994 A1 | 10/2006 | Cheemalapati et al. |
| 2007/0174407 A1 | 7/2007 | Chen et al. |
| 2008/0177994 A1 | 7/2008 | Mayer |
| 2008/0313048 A1 | 12/2008 | Killian |
| 2012/0144286 A1* | 6/2012 | Bank .................... G06F 3/0308 715/230 |
| 2013/0166393 A1 | 6/2013 | Lee et al. |
| 2014/0250378 A1 | 9/2014 | Stifelman et al. |
| 2015/0089428 A1 | 3/2015 | Grieves et al. |
| 2015/0128042 A1* | 5/2015 | Churchill ............... G06F 3/017 715/718 |
| 2015/0149964 A1 | 5/2015 | Bernstein et al. |
| 2016/0026439 A1 | 1/2016 | Zaydman et al. |
| 2018/0011926 A1* | 1/2018 | Beller ................... G06F 16/335 |
| 2019/0094551 A1 | 3/2019 | Yaras et al. |
| 2019/0095047 A1 | 3/2019 | Leroux et al. |

\* cited by examiner

SAFELY CAPTURING SUBSEQUENT KEYSTROKE INPUTS INTENDED FOR A FIRST WINDOW WHEN A SECOND WINDOW CHANGES SYSTEM FOCUS FROM THE FIRST WINDOW TO THE SECOND WINDOW

CROSS-REFERENCE TO RELATED APPLICATIONS

This application is a continuation of co-pending U.S. patent application Ser. No. 15/714,929 filed Sep. 25, 2017. The aforementioned related patent application is herein incorporated by reference in its entirety.

BACKGROUND

The present invention relates to computer software, and more specifically, to computer software which provides for safely capturing user input when an input element (such as a dialog box or pop-up) is presented.

Computer operating systems and applications will occasionally generate windows such as dialog boxes, prompts, or pop-ups. These windows typically take the system focus from the foreground application when they appear and request or require input from the user. Often, the user will not immediately realize that a new window has appeared, and will continue to interact with the computer as if the system focus never shifted to a new window. This can result in accidental interaction with the new window and data loss.

SUMMARY

In one embodiment, a method comprises receiving a first subset of keystroke inputs, of a plurality of keystroke inputs, in a first text input area in a first window, determining that a second window has changed a system focus from the first window to the second window in the absence of an explicit user request to change the system focus, wherein the second window does not include a text input area, wherein a second subset of keystroke inputs of the plurality of keystroke inputs are not received by the first text input area subsequent to changing the system focus, configuring the second window to include a safe-capture area, and capturing the second subset of keystroke inputs in the safe-capture input area while the system focus remains on the second window.

DETAILED DESCRIPTION

Embodiments disclosed herein provide techniques for capturing keystroke input and preventing inadvertent selections on pop-up windows, such as dialog boxes, when such pop-up windows steal focus from other applications. For example, a dialog box may be configured to include a safe-capture area. As used herein, a safe-capture area is any area of a user interface capable of capturing and preserving keyboard input. If the user continues typing after the system focus has shifted to the dialog box, the dialog box may be configured to store user input in the safe-capture area rather than recognizing the input as a selection on the options of the dialog box. The dialog box may be further configured to perform a predefined operation on the keystroke input captured by the safe-capture area. For example, the predefined operation may include at least one of: saving the captured input to a storage device, copying the captured input to the clipboard, spell-checking the captured input, grammar-checking the captured input, masking the captured input, or returning the captured input to the application from which the dialog box stole the system focus.

In at least one embodiment, the dialog box may be configured with a dropdown panel containing the safe-capture area. In such embodiments, the safe-capture area may be hidden within the dropdown panel by default, and revealed when the user expands the panel. In at least one embodiment, the dialog box may also be configured to hide or display the safe-capture area automatically based on the rate of keystroke input.

Figure 1A:
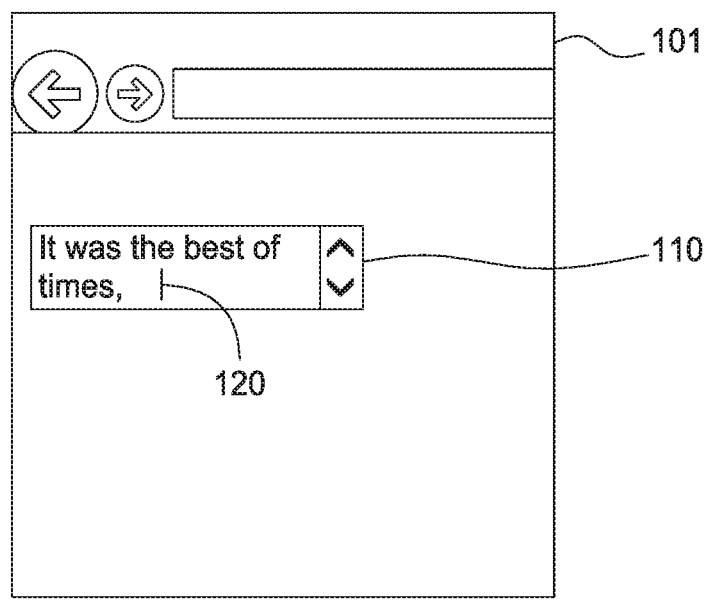
FIGS. 1A-1C illustrate an example dialog window having a safe-capture area, according to one embodiment.

FIG. 1A depicts an application window 101 having a text field 110. Application window 101 is representative of any computer window, such as operating system (OS) windows, web browser windows, word processor windows, or windows generated by any other running application. Text field 110 is representative of any area or object that accepts and displays keystroke input. Keystroke input may include hardware-based input such as that from hardware keyboards, or software input such as that from software keyboards, voice-to-text applications, macros, or any other software that can trigger keystroke events. The cursor 120 shows where the next keystroke will appear. As shown in FIG. 1A, a user has entered "It was the best of times," as keystroke input in text field 110. As used herein, a "user" that provides keystroke input may refer to a human operator or software that provides keystroke input.

Figure 1B:
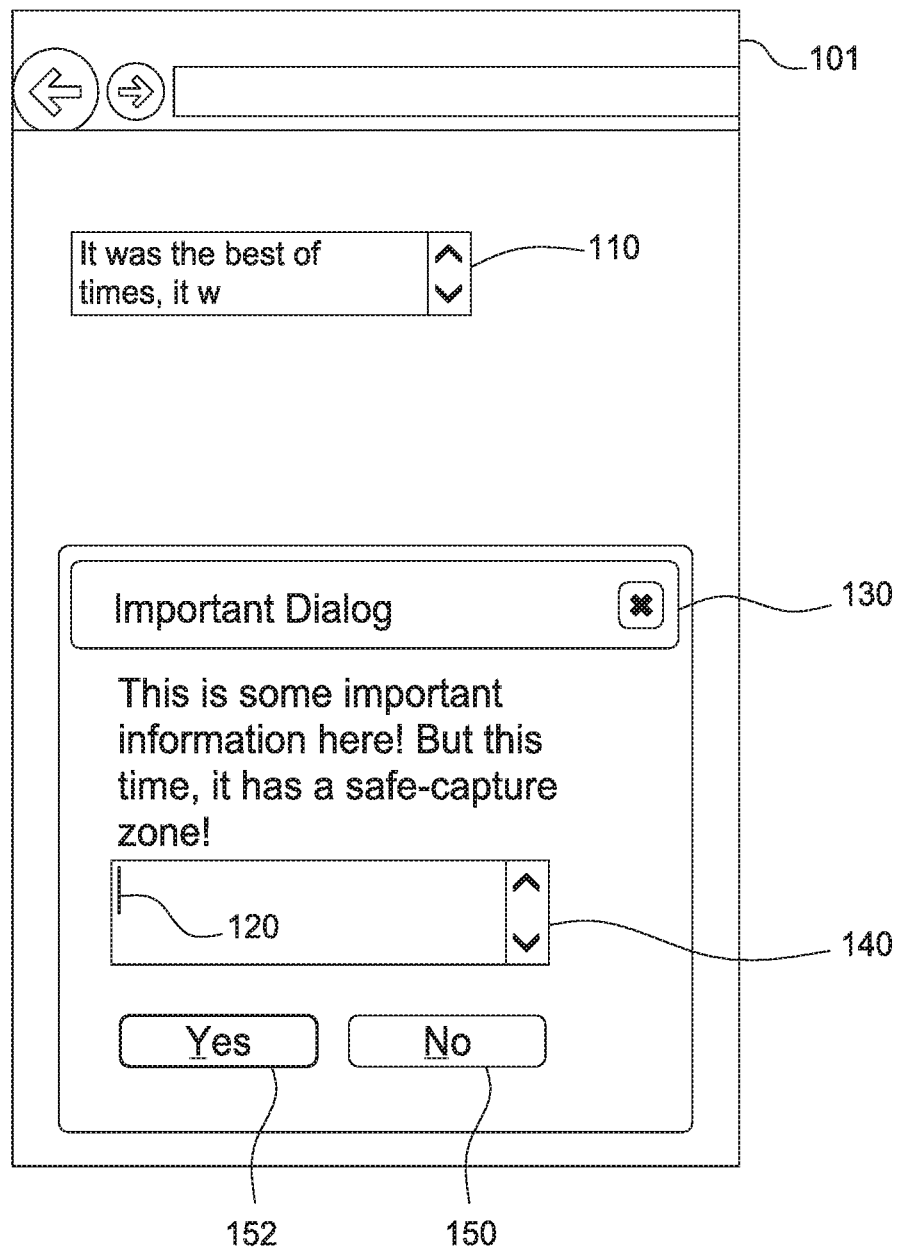

As shown in FIG. 1B, a dialog box 130 has been generated and outputted over application window 101 while the user enters text in text box 110. When generated, dialog box 130 takes the system focus from application window 101 (that is, dialog box 130 becomes the active area output on the display screen), such that subsequent keystrokes will not be provided to text field 110 and will instead be directed to the dialog box 130. As shown, dialog box 130 includes dialog-selection buttons 150 and 152. The user may select buttons 150 and 152 using a mouse, keyboard, or other input device. Advantageously, as shown, dialog box 130 includes a safe-capture area 140. Generally, the safe-capture area 140 is configured to capture keystroke input provided by the user. The safe-capture area 140 is not a component of the dialog box 130 as defined by the source code used to generate the dialog box 130. Instead, the safe-capture area 140 is added to the dialog box as an extra component to avoid the loss of keystroke input intended for text field 110. Therefore, the safe-capture area 140 may be added to the dialog box 130 by the operating system.

As shown, cursor 120 has been placed inside safe-capture area 140 after the focus has changed from application window 101 to dialog box 130. As the user continues to provide keystroke input, safe-capture area 140 captures subsequent keystroke inputs intended for text field 110. Otherwise, the keystrokes may be registered as a selection of button 150 or 152, or lost completely as not being provided directly to text field 110. In at least one embodiment, dialog box 130 is configured to allow the user to tab out of safe-capture area 140 in order to use keyboard input to select button 150 or 152. The dialog box 130 may include other, default text input areas (not shown). In such embodiments, placing the cursor 120 in the safe-capture area 140 causes the subsequent keystrokes to be captured in the safe-capture area 140, rather than the default text input areas of the dialog box 130.

Figure 1C:
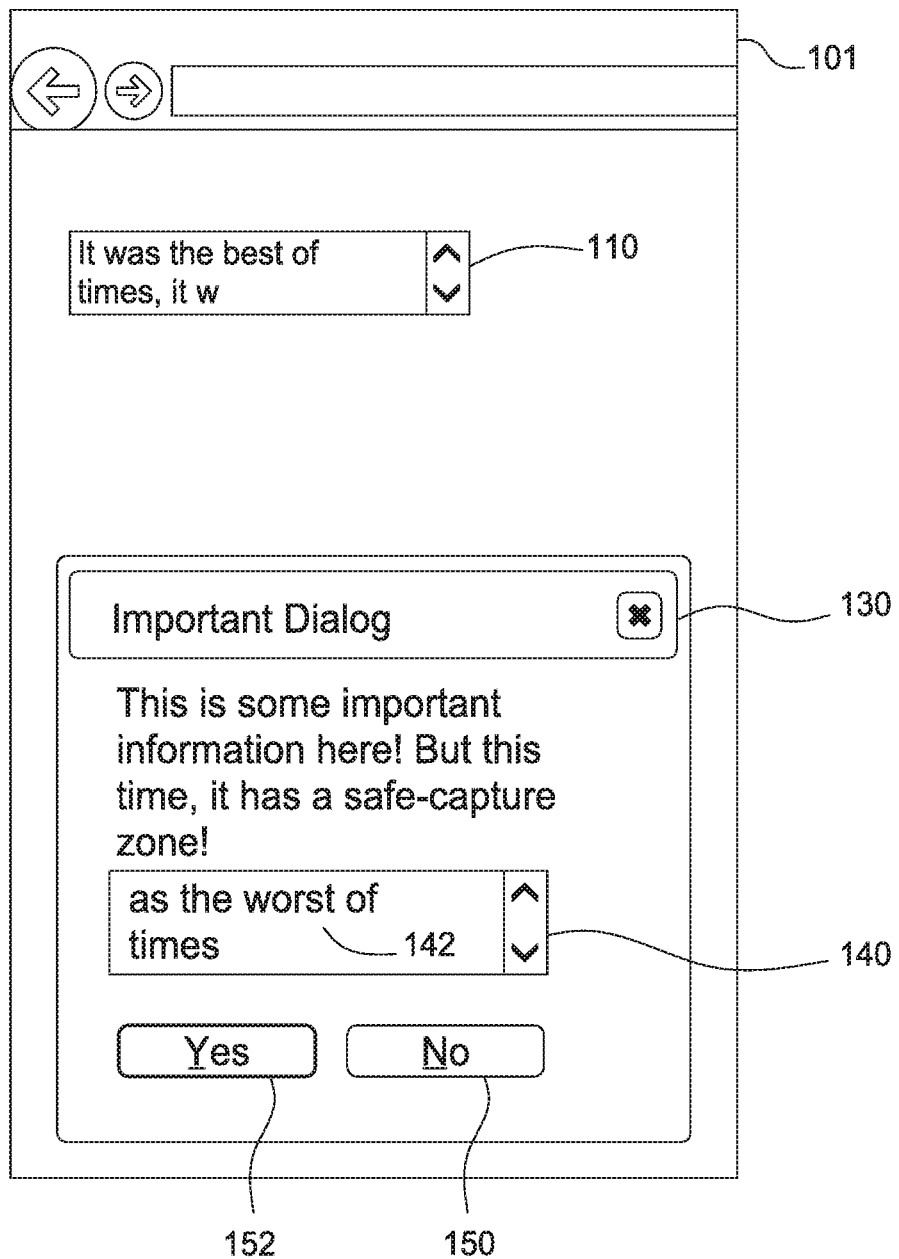

FIG. 1C depicts the dialog box 130 over application window 101. As shown, the user continues to provide keystroke input 142 intended for text box 110. However, as shown, this keystroke input 142 is captured by safe-capture area 140, and is not lost or otherwise registered as selection of one of the buttons 150, 152. Specifically, as shown, the input 142 is the text segment of "as the worst of times." Advantageously, the keystroke input 142 is retained by the safe-capture area 140.

Figure 2:
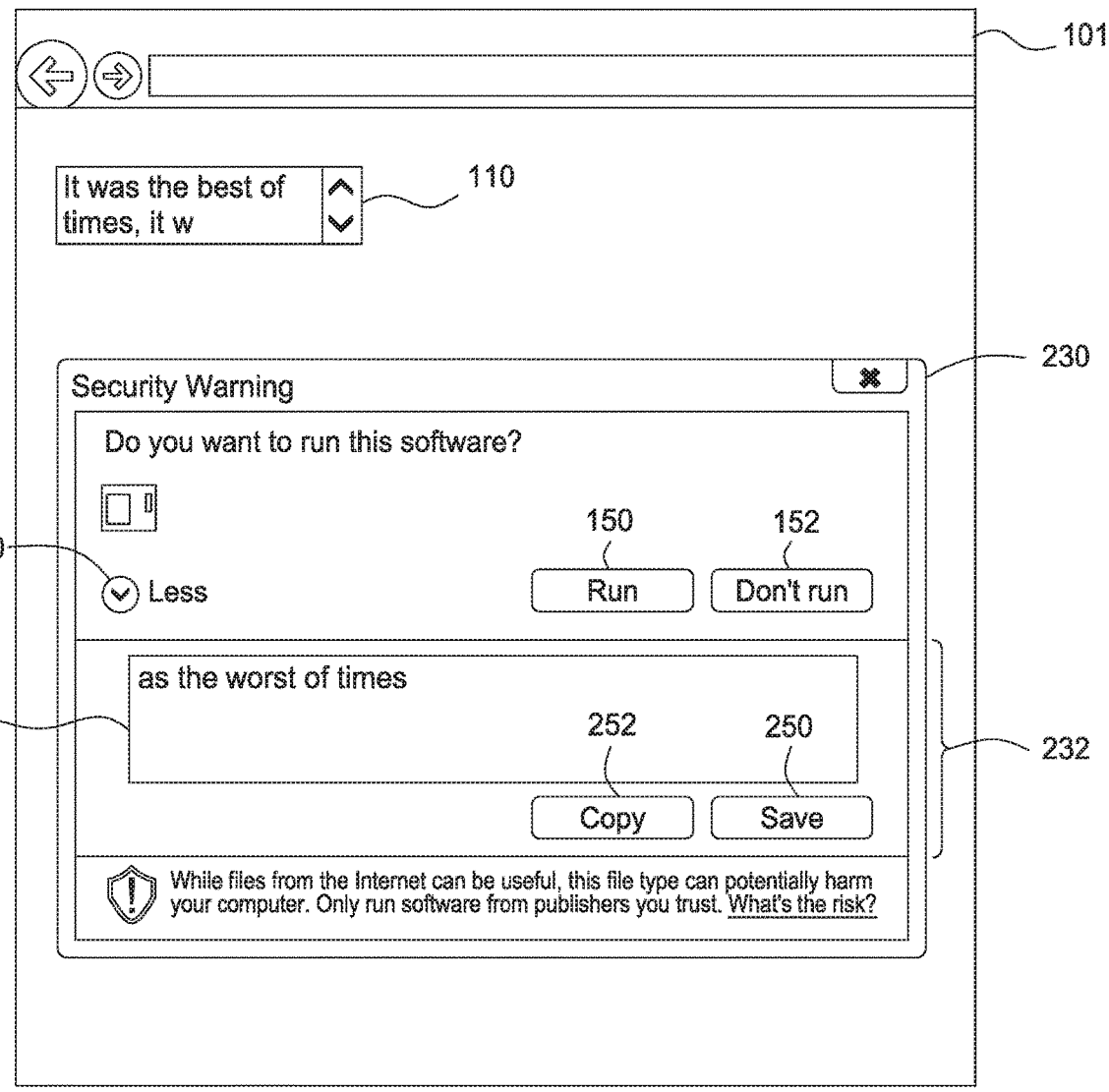
FIG. 2 illustrates an example dialog window having a dropdown tray comprising a safe-capture area, according to one embodiment.

FIG. 2 depicts a dialog box 230 with a dropdown tray 232. Generally, the dropdown tray 232 includes the safe-capture area 140. As shown, the dialog box 230 includes an expand button 260. When a user selects the expand button 260, the system may be configured to toggle between revealing and hiding the dropdown tray 232. When generated, the safe-capture area 140 of the dialog box 230 captures keystroke input intended for the text field 110, whether or not the dropdown tray 232 has been revealed by the user. As shown, when the user expand dropdown tray 232, the safe-capture area 140 includes the text input of "as the worst of times."

Advantageously, the dialog box 230 includes the buttons 250 and 252, which control aspects of the safe-capture area 140. In one embodiment, button 250 is a copy button which, when selected, copies the captured text to a clipboard of the operating system. Similarly, button 252 is a save button which saves the captured text to a local or remote storage device. Furthermore, the dialog box 230 may be configured to automatically hide or reveal the safe-capture area based on a rate of user input. For example, the safe-capture area 140 may be configured to capture text only if the keystroke input exceeds a threshold rate at the time the dialog box 230 is presented. In such embodiments, if the rate of keystroke input exceeds the threshold rate, the dialog box 230 may automatically reveal the safe-capture area 140.

Figure 3:
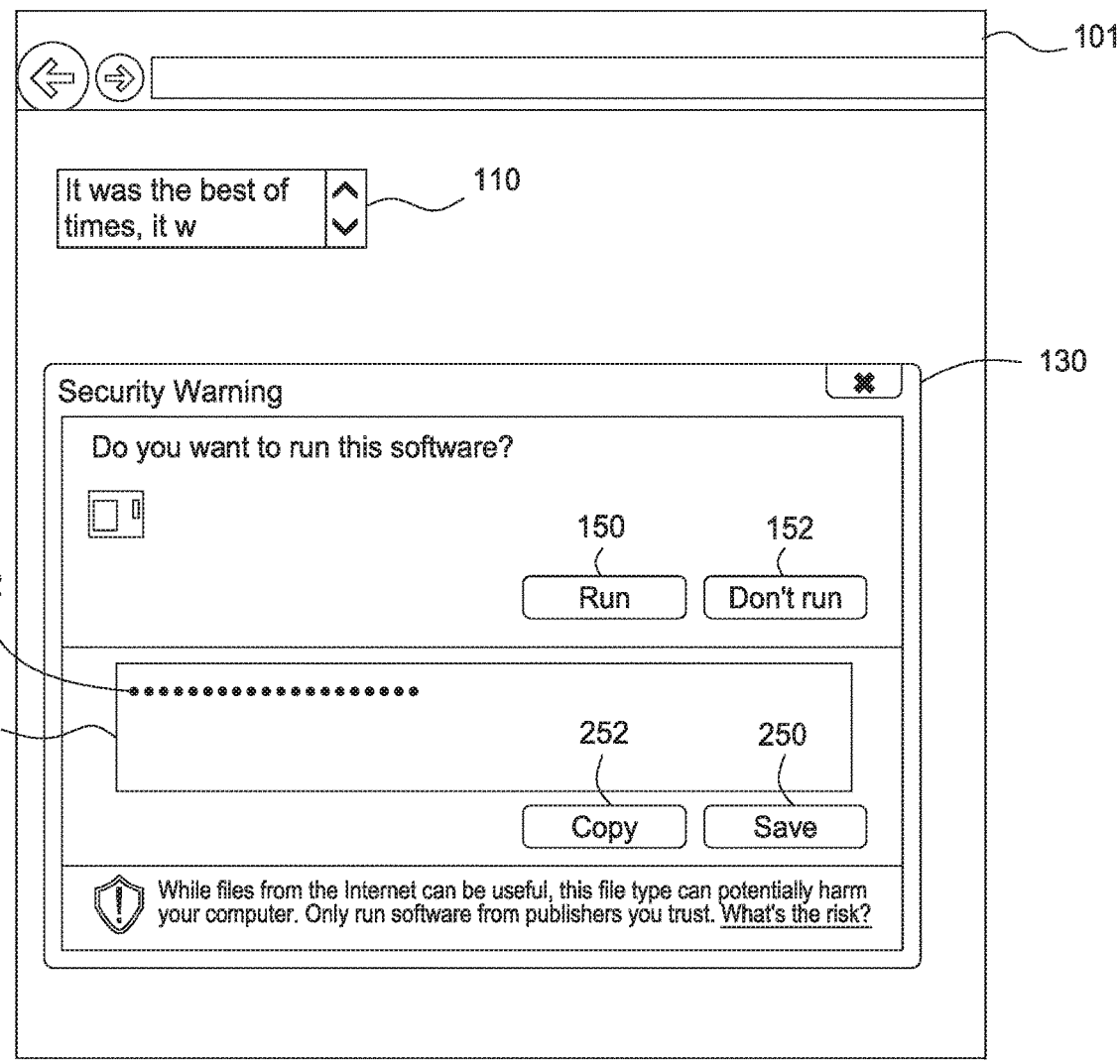
FIG. 3 illustrates an example dialog window having a safe-capture area, wherein the safe-capture area masks captured text, according to one embodiment.

FIG. 3 depicts an embodiment where dialog box 130 is configured to automatically perform an additional operation to the text captured in safe-capture area 140. As shown in FIG. 3, the safe-capture area 140 of the dialog box 130 displays captured input as masked text 342, which may prevent the unintended revelation of keystroke input to other users. The safe-capture area 140 may further be configured to perform other operations on text captured in the safe-capture area 140. For example, the safe-capture area 140 may perform spell-checking and/or grammar-checking on the text in the safe-capture area 140, transfer the text to another application (e.g., provide the text to the text field 110), and the like.

Figure 4:
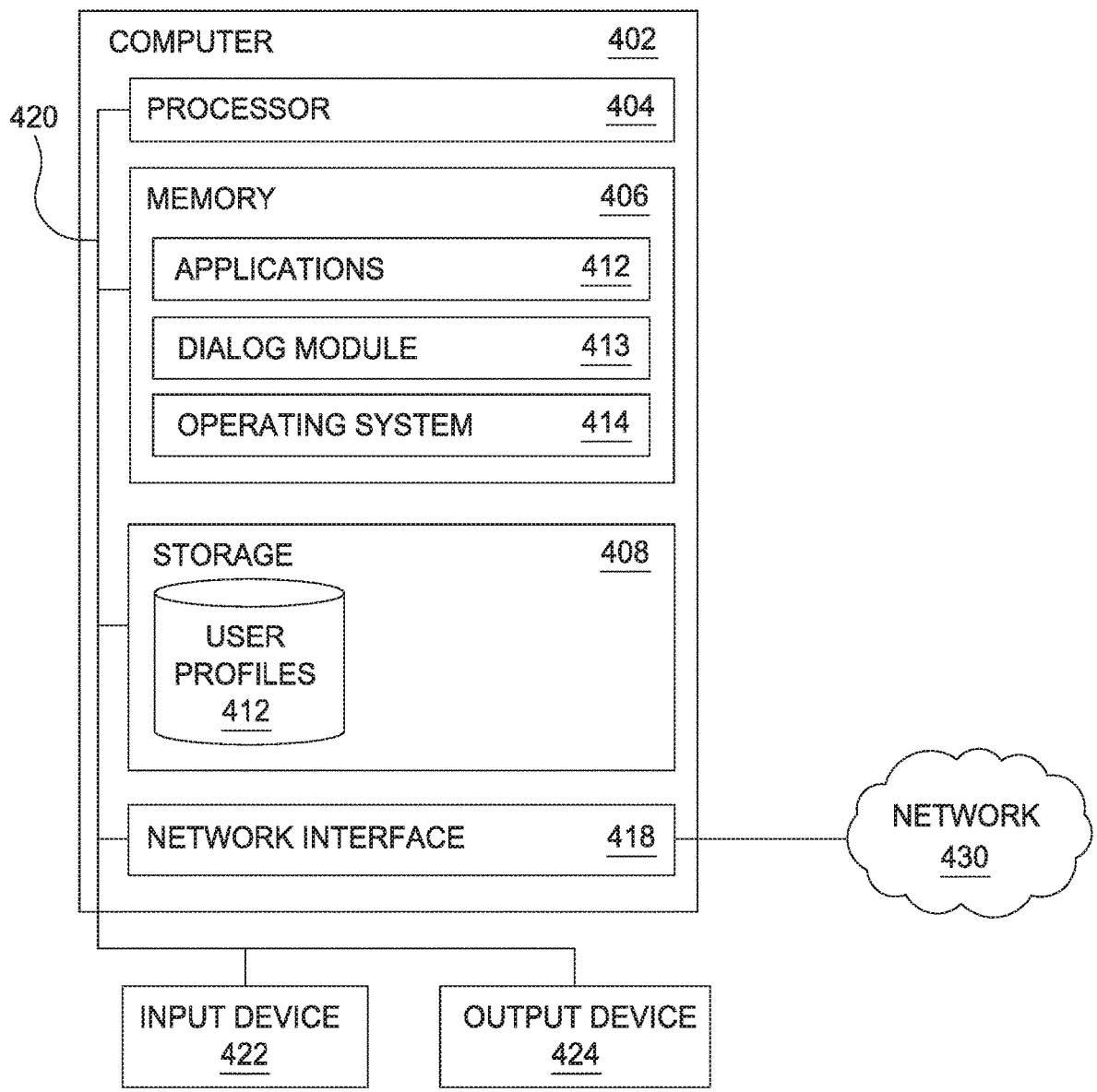
FIG. 4 illustrates an example system architecture which provides the dialog window with safe-capture area, according to one embodiment.

FIG. 4 is a block diagram illustrating a system 400 which provides the dialog box with a safe-capture area 140. The networked system 400 includes a computer 402. The computer 402 may also be connected to other computers via a network 430. In general, the network 430 may be a telecommunications network and/or a wide area network (WAN). In a particular embodiment, the network 430 is the Internet.

The computer 402 generally includes a processor 404 which obtains instructions and data via a bus 420 from a memory 406 and/or a storage 408. The computer 402 may also include one or more network interface devices 418, input devices 422, and output devices 424 connected to the bus 420. The computer 402 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is a programmable logic device that performs instruction, logic, and mathematical processing, and may be representative of one or more CPUs. The network interface device 418 may be any type of network communications device allowing the computer 402 to communicate with other computers via the network 430.

The storage 408 is representative of hard-disk drives, solid state drives, flash memory devices, optical media and the like. Generally, the storage 408 stores application programs and data for use by the computer 402. In addition, the memory 406 and the storage 408 may be considered to include memory physically located elsewhere; for example, on another computer coupled to the computer 402 via the bus 420.

The input device 422 may be any device for providing input to the computer 402. For example, a keyboard and/or a mouse may be used. The input device 422 represents a wide variety of input devices, including keyboards, mice, controllers, and so on. Furthermore, the input device 422 may include a set of buttons, switches or other physical device mechanisms for controlling the computer 402. The output device 424 may include output devices such as monitors, touch screen displays, and so on.

As shown, the memory 406 contains the dialog module 413, which is an application generally configured to create and display dialog boxes that include safe-capture areas such as the safe-capture area 140. The safe-capture area may be configured to accept input from any input device 422 that produces keystroke events. Memory 406 also contains applications 412 that produce keystroke events. The applications 412 include speech-to-text applications, keystroke generation applications, and the like. The dialog module 413 may be incorporated into the operating system 414, as part of one or more applications 412, or as its own separate module. The dialog module 413 may further be configured to perform a predefined operation on the text captured by the safe-capture area.

As shown, the storage 408 contains the user profiles 412. The user profiles may specify the behavior of dialog boxes and the safe-capture areas 140 included therein. For example, the user profiles 412 may specify which predefined operations will be performed on the text captured in a safe-capture area 140. The profiles 412 may also specify the threshold keystroke rate needed to trigger the safe-capture area.

Figure 5:
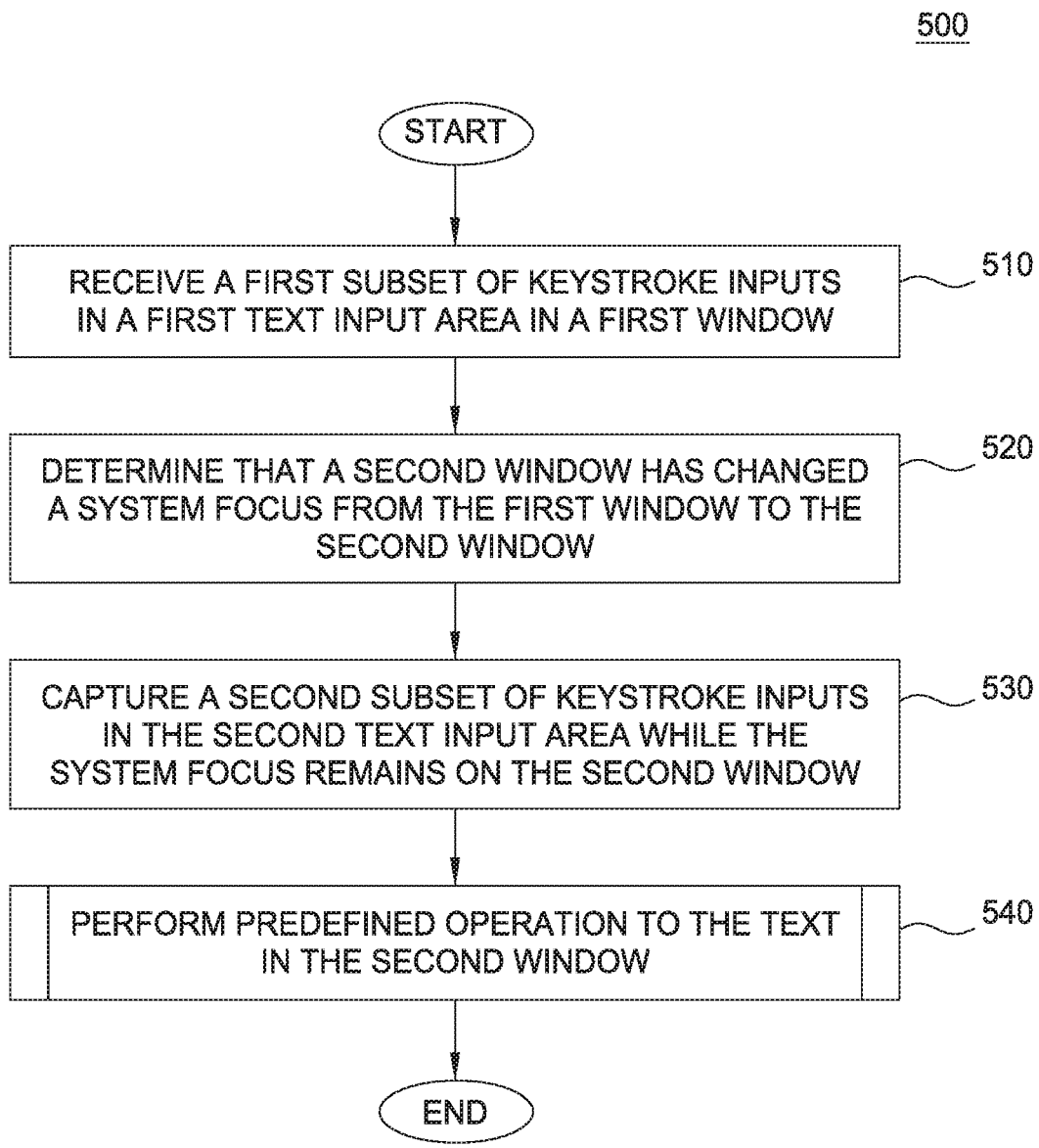
FIG. 5 is a flow chart illustrating an example method 500 to capture keystroke input in a safe-capture area, according to one embodiment.

FIG. 5 is a flow chart illustrating an example method 500 to capture keystroke input in a safe-capture area 140. As shown, the method begins at block 510, where the dialog module 413 determines that a first text input area in a first window has received a first subset of keystroke inputs. As previously indicated, a user, an application 412, or the operating system 414 may provide the first subset of keystroke inputs. The first window may be associated with an application such as a web browser, word processing application, or any other application which receives keystroke input.

At block 520, dialog module 413 determines that a second window has taken the system focus from the first window. Initially, the second window may not include a safe-capture area 140. As such, the second window may be configured to include the safe-capture area 140. For example, the operating system may override the default specifications for the second window to include the safe-capture area 140. The second window may be, for example, a dialog box that is generated by the operating system, by the application associated with the first window, or by another application. The safe-capture area 140 is configured to receive keystroke input provided by a user or application. At block 530, the dialog module 413 captures a second subset of keystrokes in the safe-capture area 140. By directing keystroke input to the safe-capture area 140, the user does not lose information and is prevented from inadvertently selecting a displayed dialog option (such as clicking "yes" or "no" to install operating system updates).

At block 540, described in greater detail with reference to FIG. 6, the dialog module 413 performs a predefined operation on the captured text. In at least one embodiment, the predefined operation is based on user-specified settings in the user profiles 412. For example, a first user may specific to automatically provide the text captured in the safe-capture area 140 to the first text input area. Similarly, a second user may specify to automatically copy the text captured in the safe-capture area 140. Generally, any number and types of operations may be performed on the text input captured in the safe-capture area 140.

Figure 6:
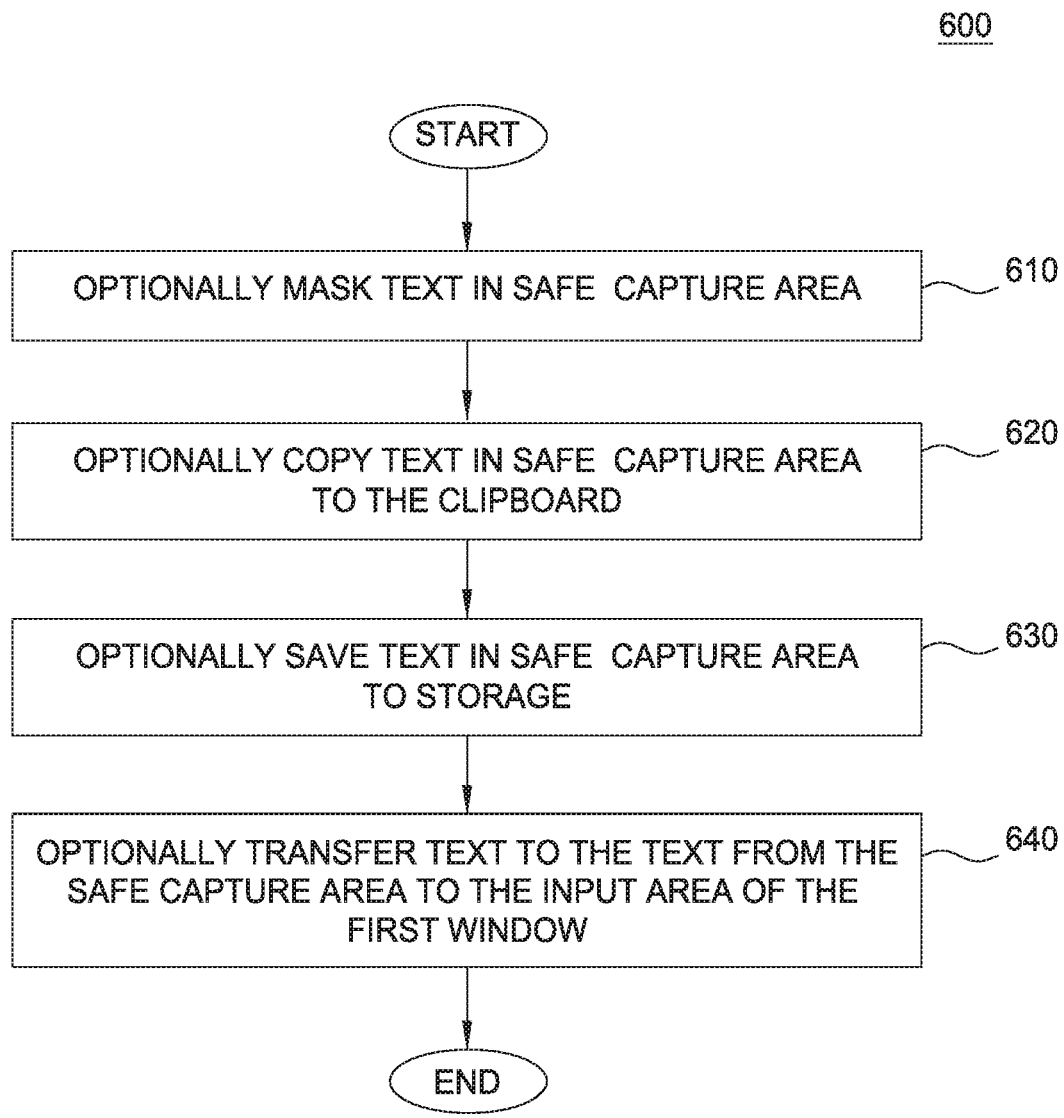
FIG. 6 is a flow chart illustrating an example method to produce the predefined operations the safe-capture area can perform on captured text, according to one embodiment.

FIG. 6 is a flow chart illustrating an example method 600 corresponding to block 540 to perform a predefined operation to text captured in the safe-capture area 140. In at least one embodiment, the dialog module 413 executes the blocks of the method 600. As shown, the method begins at block 610 where dialog module 413 optionally performs a predefined operation to mask the text in the safe-capture area 140. Doing so may be based on settings specified in the user profile 412. Similarly, the dialog module 413 may analyze the text captured in the safe-capture area 140 to determine whether the text includes sensitive concepts. For example, if the word "confidential" is detected in the text captured in the safe-capture area 140, the dialog module 413 may mask the keystroke input to preserve the confidentiality of the text.

At block 620, the dialog module 413 may optionally copy the captured text to a clipboard of the operating system. Doing so allows the user to easily paste the captured elsewhere. The dialog module 413 may perform the copy operation automatically based on user preferences. Similarly, the dialog module 413 may perform the copy operation responsive to user input specifying to copy the text (e.g., when the user highlights the text with a cursor, or selects a button specifying to copy the text).

At block 630, dialog module 413 optionally saves the captured text to storage. The user profile 412 may specify how and where the text is stored. This user profile 412 may specify parameters for storing the text, such as a file format and destination storage location. The destination storage location may be a local storage device or a storage device in the cloud. In at least one embodiment, the dialog module 413 automatically saves the text to storage. In another embodiment, the dialog module 413 saves the text to storage responsive to receiving user input specifying to save the text to storage.

At block 640, dialog module 413 transfers the text captured in the safe-capture area 140 to the first text input area of the first window. In one embodiment, the dialog module 413 performs the transfer automatically (e.g., when a user profile 412 specifies to automatically return the captured text to its intended window). In another embodiment, the dialog module 413 transfers the text responsive to user input specifying to return the text to the intended window.

Advantageously, embodiments disclosed herein provide techniques to capture keystroke input. For example, a user may provide keystroke input to a text box of a first window (or application). While the user provides keystroke input to the text box of the first window, a second window may take the system focus from the first window, such that subsequent keystroke input is not provided to the text box of the first window. Advantageously, however, a safe-capture area of the second window may capture the subsequent keystroke input, such that the subsequent keystroke input is not lost. Furthermore, the safe-capture area may be further configured to perform a plurality of different predefined operations on the captured text. For example, the safe-capture area may spell-check the text, perform grammar checking on the text, copy the text to a system clipboard, save the text to storage, and provide the captured text to the intended input area (e.g., the text box of the first window).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:

receiving a first subset of keystroke inputs, of a plurality of keystroke inputs, in a first text input area in a first window;

determining that a second window has changed a system focus from the first window to the second window in the absence of an explicit user request to change the system focus, wherein the second window does not include a text input area, wherein a second subset of keystroke inputs of the plurality of keystroke inputs are not received by the first text input area subsequent to changing the system focus;

configuring the second window to include a safe-capture input area; and capturing the second subset of keystroke inputs in the safe-capture input area while the system focus remains on the second window.

2. The method of claim 1, further comprising:

determining that a rate of keystroke entry does not exceed a predefined keystroke rate threshold; and removing the safe-capture input area from the second window.

3. The method of claim 1, further comprising:

storing the second subset of keystrokes captured by the safe-capture input area on a storage device.

4. The method of claim 1, wherein the safe-capture input area further comprises a button, which when selected, copies the second subset of keystrokes captured by the safe-capture input area to a clipboard.

5. The method of claim 1, wherein the second window comprises a dropdown panel including the safe-capture input area, wherein the second window is configured to hide the safe-capture input area when the dropdown panel is closed, wherein opening the dropdown panel exposes the safe-capture input area.

6. The method of claim 1, further comprising:

providing the second subset of keystrokes captured by the safe-capture input area to the first text input area of the first window.

7. The method of claim 1, further comprising:

prior to capturing the keystrokes in the safe-capture input area of the second window, determining that a rate of keystroke entry exceeds a predefined keystroke rate threshold, wherein the keystrokes are captured in the safe-capture input area of the second window upon determining the predefined keystroke rate threshold is exceeded.

* * * * *